J. C. SMALLEY.
COMBINED PEN STAND AND WIPER.
APPLICATION FILED MAY 14, 1918.

1,291,212.

Patented Jan. 14, 1919.

Witnesses

Inventor
John C. Smalley
By Victor J. Evans
Attorney

UNITED STATES PATENT OFFICE.

JOHN C. SMALLEY, OF CHIPPEWA FALLS, WISCONSIN.

COMBINED PEN STAND AND WIPER.

1,291,212.

Specification of Letters Patent.   Patented Jan. 14, 1919.

Application filed May 14, 1918. Serial No. 234,496.

*To all whom it may concern:*

Be it known that I, JOHN C. SMALLEY, a citizen of the United States, residing at Chippewa Falls, in the county of Chippewa and State of Wisconsin, have invented new and useful Improvements in Combined Pen Stands and Wipers, of which the following is a specification.

This invention relates to a new article of manufacture which is primarily intended to be employed as a combined holder and wiper for pens.

The primary object of the invention is to provide an inexpensive, attractive article of this character having a wiper so constructed and arranged with relation to a pen rack on the stand, that to place a pen in the rack, whose point is engaged with the wiper will necessitate the pen being moved in such a manner as to cause the wiper to remove ink from both sides of the point of the pen.

Another object of the invention is to provide an article of this character wherein a pen point wiper comprising a plurality of superimposed strips of absorbent material is arranged within a holder which, not only maintains the strips gently pressed against each other, but allows the wiper to be readily removed from the article for the interchanging or reversing of the strips when they have become disfigured with ink.

Another object of the invention is to so construct a stand comprising a part of the article and the holder for the wiper that air may contact with the strips of absorbent material for the drying of the ink absorbed thereby.

With these and other objects in view the invention resides in the novel combination and arrangement of parts which will be hereinafter described and particularly pointed out in the claims.

In the drawing.

Like characters of reference denote the corresponding parts throughout the several views in the drawings.

Figure 1:
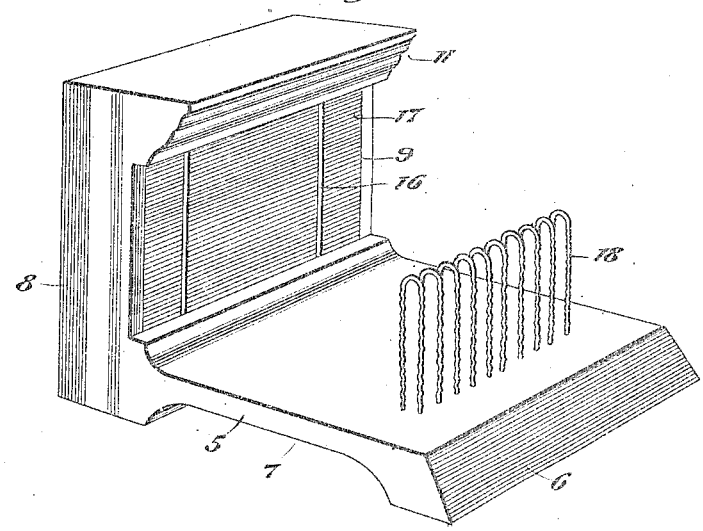
Figure 1 is a perspective view of an article of manufacture constructed in accordance with the invention.
Figure 2:
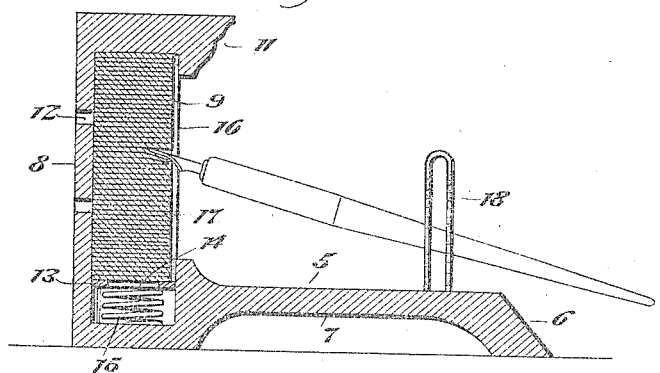
Fig. 2 is a vertical longitudinal sectional view therethrough.
Figure 3:
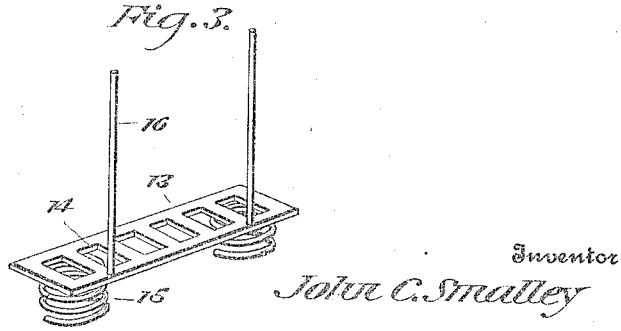
Fig. 3 is a perspective view of the holder for the pen point wiper.

Referring now to the drawings in detail the letter A designates an article of manufacture which when constructed in accordance with the invention may be employed as a combined stand and wiper for pens.

The combined stand and wiper includes a base 5 which is formed from any material which may be ornamented to render the base attractive and is provided with a beveled end 6 and has formed in its bottom a transversely extending channel 7. Formed integral with the base 5 adjacent its other end is a housing 8 which extends below the top of the base 5 and is provided with an open front 9. The top 10 of the housing has extending along one side edge thereof a flange 11 which may be curved or otherwise ornamented as desired. The back of the housing has formed therein a plurality of ventilating openings 12.

Arranged within the housing 8 is a wiper holder which comprises a rectangular shaped plate 13 which extends transversely of the housing and has formed therein a row of spaced and transversely extending openings 14. The plate 13 is supported within the housing upon a pair of coiled expansion springs 15 which are connected with the under side of the plate and engage the bottom of the housing. Extending upwardly from one side edge of the plate 13 are a pair of spaced rods 16 which are normally held by the springs 15 in engagement with the top 10 of the housing so that the holder cannot be withdrawn from the housing until the plate 13 has been pushed downwardly sufficiently far to allow the rods to be withdrawn from behind the flange 11.

Arranged within the holder is a pen wiper which comprises a plurality of strips of absorbent material 17. The strips 17 which are arranged one upon another are held gently pressed against each other by the springs and are prevented from being displaced from the housing by the rods 16.

By providing the stand with a wiper holder constructed as above described it is apparent that when necessary the holder may be readily removed from the housing for the renewal or the interchanging of the strips 17.

Extending transversely of the top of the base 5 adjacent its beveled end is a pen rack which is formed from a row of spaced resilient loops 18, the arms of which are quint throughout their length.

The pen rack is of a height slightly greater than half the height of the opening in the front of the housing 8, so that to insert the point of a pen between the strips 17 the pen must be held in an inclined position, thus insuring the ink being wiped from one side of the pen point as the point has passed between the strips.

When the pen point has been inserted between the strips 17 it is necessary in placing the pen between a pair of the loops 18 to swing the pen downwardly which causes one of the strips between which the pen point is passed to wipe the ink from the other side of the point.

From the foregoing description taken in connection with the accompanying drawings it is apparent that a combined rack and wiper have been provided which though inexpensive of manufacture is highly efficient in removing ink from points on the pens arranged thereon.

Having thus described the invention what is claimed as new, is:

1. A combined pen stand and wiper comprising a base, and an upstanding housing adjacent one end of the base having an opening in its front, a wiper in said housing, and a transversely extending pen rack adjacent the opposite end of the base of less height than the opening in the front of said housing.

2. A combined pen stand and wiper comprising a base, an upstanding housing adjacent one end of the base having an opening in its front, a transversely extending vertically movable wiper holder in said housing, a laminated wiper carried by said holder and a transversely extending row of spaced resilient loops adjacent the opposite end of said base of a height slightly greater than half the height of the opening in said housing.

3. A combined pen stand and wiper comprising a base, an upstanding housing adjacent one end of the base providing a compartment extending below the top of the base, said housing having an opening in its front of less height than the height of said compartment, a yieldably supported apertured plate in said compartment below the bottom of said opening, rods on said plate extending above the top of said opening, a laminated wiper in said holder, and an upstanding rack adjacent the opposite end of said base.

4. A combined pen stand and wiper, a supported housing having an opening in the front thereof between its ends, a transversely extending plate within said housing below said opening having longitudinally extending rows of spaced slots therein, coiled expansion springs on the under side of said plate engaging the bottom of said housing, spaced rods at one side of said plate extending transversely of said opening, and strips of absorbent material spaced one upon another extending between said plate and the top of said compartment.

In testimony whereof I affix my signature.

JOHN C. SMALLEY.

Copies of this patent may be obtained for five cents each, by addressing the "Commissioner of Patents, Washington, D. C."